UNITED STATES PATENT OFFICE.

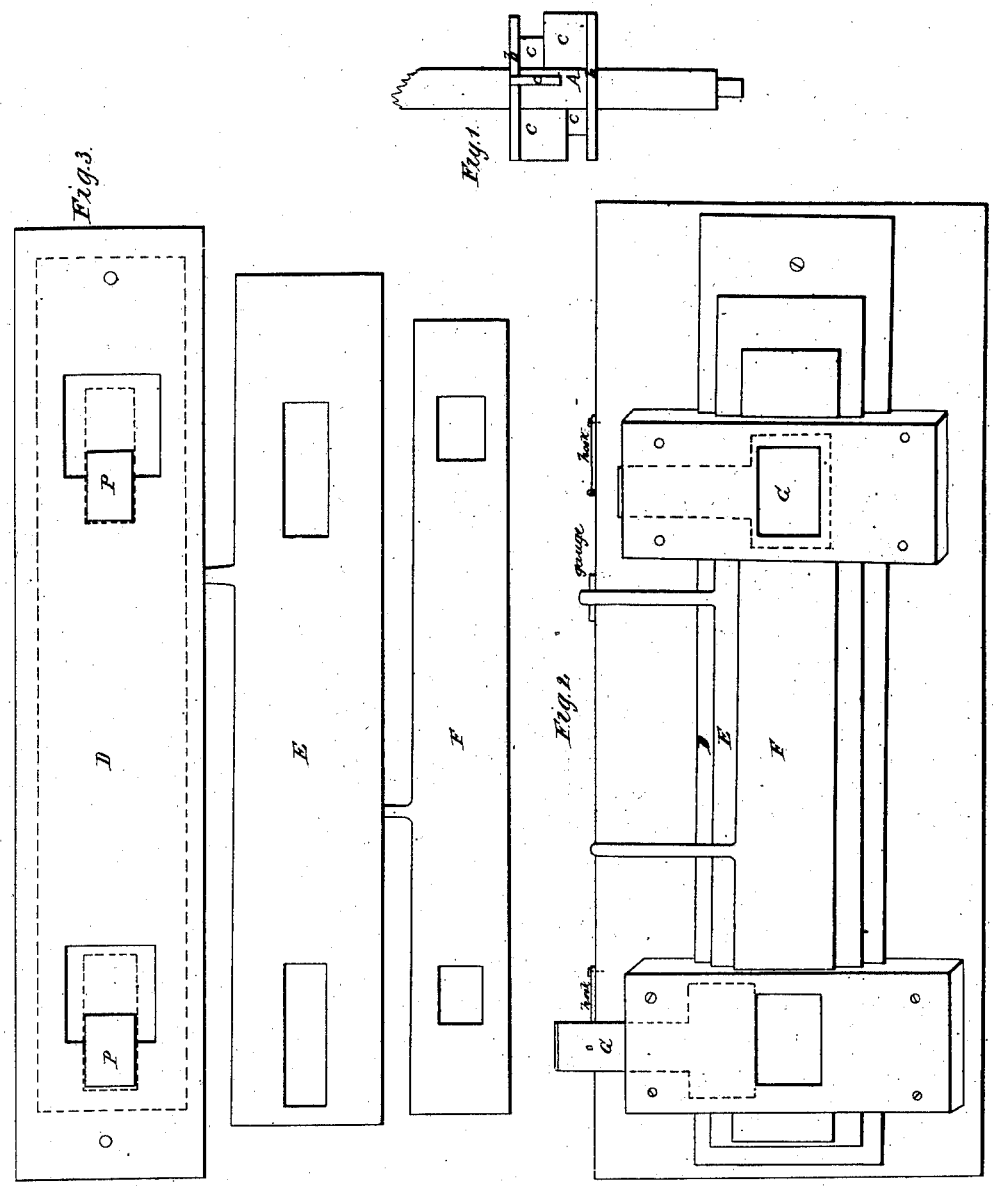

WM. H. NAUMAN, OF DAYTON, OHIO.

IMPROVEMENT IN SEED-DRILLS.

Specification forming part of Letters Patent No. 45,335, dated December 6, 1864.

*To all whom it may concern:*

Be it known that I, WILLIAM H. NAUMAN, of Dayton, in the county of Montgomery, in the State of Ohio, have invented a new and useful Improvement in Seed-Drills; and I do hereby declare that the following is a full, clear, and exact description of the construction and operation of the same, reference being had to the accompanying drawings, making a part of this specification, in which—

Figure 1 represents the feeder; Fig. 2, the bottom of the hopper with slides attached, and Fig. 3 the slide D detached.

The object of my invention is to provide a drill that will feed grain more regularly than other seed-drills, and which is free from the liability to choke from an accumulation of grain while turning at the end of the furrow.

The feeder A, which runs over an aperture in the bottom of the seed-box, is provided with wings $c\ c\ c$, projecting toward either flange $b\ b$, but leaving a space between the wing and the opposite flange. This arrangement forces the grain through lengthwise, thus avoiding a liability to choke.

The slide D is provided with clips $p\ p$, soldered, riveted, pressed, or cast on, and is placed next to the bottom of the hopper. This greatly lessens the distance through which the grain passes before reaching the conductors, thus rendering a more certain and regular flow of grain. The slide E is placed next to the slide D, and has openings corresponding to and fitting the clips $p\ p$. This slide is connected with and regulated by a gage placed on the side of the box, and thus adjusted to the required flow of seed. Next to the slide E is placed the cut-off slide F. The slides G G are for pointing the rows. The advantage of the arrangement of these slides is that the cut-off slide F operates close to the slide E, thereby avoiding a chamber in which grain can accumulate in turning around at the end of a field. The cut-off slide as used in other drills leaves a chamber where grain will accumulate every time the flow of seed is cut off, and consequently every time the machine is started it leaves a considerable quantity of seed down. My arrangement is calculated to obviate that entirely.

Having thus described my improvement, what I claim as my invention, and desire to secure by Letters Patent, is—

1. The feeder A, having flanges $b\ b$, with wings $c\ c\ c$ projecting toward either flange, and leaving a space between the flange and wing on either side, said feeder running over and in combination with an aperture in the bottom of the hopper.

2. The slide D, placed next to the hopper-bottom, in combination with the adjustable slide E', cut-off F, and slides G G, when arranged and operating as and for the purposes set forth.

WM. H. NAUMAN.

Witnesses:
JAMES TURNER,
RALPH S. THOMPSON.